(12) United States Patent
Takahashi et al.

(10) Patent No.: US 11,347,024 B2
(45) Date of Patent: May 31, 2022

(54) DRIVING APPARATUS, LENS UNIT, DEVICE, AND CORRECTION METHOD FOR EXTERNAL DISTURBANCE MAGNETIC FIELD

(71) Applicant: Asahi Kasei Microdevices Corporation, Tokyo (JP)

(72) Inventors: Arata Takahashi, Tokyo (JP); Yuki Uchibori, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 653 days.

(21) Appl. No.: 15/990,825

(22) Filed: May 29, 2018

(65) Prior Publication Data

US 2018/0275369 A1 Sep. 27, 2018

Related U.S. Application Data

(63) Continuation of application No. PCT/JP2016/085454, filed on Nov. 29, 2016.

(30) Foreign Application Priority Data

Nov. 30, 2015 (JP) .............................. JP2015-233680

(51) Int. Cl.
*G02B 7/08* (2021.01)
*G02B 7/10* (2021.01)
(Continued)

(52) U.S. Cl.
CPC ............... *G02B 7/102* (2013.01); *G02B 7/08* (2013.01); *G02B 27/646* (2013.01); *G03B 3/10* (2013.01);
(Continued)

(58) Field of Classification Search
CPC . G02B 7/08; G02B 7/102; G02B 7/28; G02B 27/646; G03B 3/10; G03B 5/00;
(Continued)

(56) References Cited

U.S. PATENT DOCUMENTS 5,939,804 A    8/1999 Nakao
10,162,150 B2  12/2018 Lu
(Continued)

FOREIGN PATENT DOCUMENTS

CN    1932631 A    3/2007
CN    101241220 A   8/2008
(Continued)

OTHER PUBLICATIONS

International Search Report for International Patent Application No. PCT/JP2016/085454, issued by the Japan Patent Office dated Mar. 7, 2017.

(Continued)

*Primary Examiner* — Ryan S Dunning

(57) ABSTRACT

A driving apparatus, a lens unit, a device, a correction method, and a computer readable recording medium are provided, the driving apparatus including an actuator that changes a relative position between a lens section and an imaging device; a magnetic field detection section that detects magnetic field information corresponding to the relative position between the lens section and the imaging device; a storage section that stores reference information that is based on an output of the magnetic field detection section when the lens section or the imaging device is positioned at the reference position; and a control section that controls a driving amount of the actuator based on the magnetic field information and the reference information.

23 Claims, 10 Drawing Sheets

(51) Int. Cl.
  *G02B 27/64* (2006.01)
  *G03B 13/36* (2021.01)
  *G03B 5/00* (2021.01)
  *H04N 5/232* (2006.01)
  *H04N 5/225* (2006.01)
  *G03B 3/10* (2021.01)
  *G02B 7/28* (2021.01)

(52) U.S. Cl.
  CPC ............... *G03B 5/00* (2013.01); *G03B 13/36* (2013.01); *H04N 5/2257* (2013.01); *H04N 5/23287* (2013.01); *H04N 5/23293* (2013.01); *G02B 7/28* (2013.01); *G03B 2205/0007* (2013.01); *G03B 2205/0069* (2013.01)

(58) Field of Classification Search
  CPC ............ G03B 13/36; G03B 2205/0007; G03B 2205/0069; H04N 5/2257; H04N 5/23287; H04N 5/23293
  USPC .................................................. 359/557, 698
  See application file for complete search history.

(56) References Cited

U.S. PATENT DOCUMENTS

| | | |
|---|---|---|
| 2003/0030920 A1 | 2/2003 | Okawara |
| 2004/0037547 A1 | 2/2004 | Okawara |
| 2006/0028320 A1 | 2/2006 | Osaka |
| 2010/0195074 A1 | 8/2010 | Sogard |
| 2015/0130388 A1 | 5/2015 | Fukushima |
| 2015/0198783 A1 | 7/2015 | Shimotsu |

FOREIGN PATENT DOCUMENTS

| | | |
|---|---|---|
| CN | 202472099 U | 10/2012 |
| CN | 102809873 A | 12/2012 |
| EP | 0493260 A1 | 7/1992 |
| JP | H0850515 A | 2/1996 |
| JP | 2009180990 A | 8/2009 |
| JP | 2010231043 A | 10/2010 |
| JP | 2011022563 A | 2/2011 |
| JP | 2012184983 A | 9/2012 |
| JP | 2014038212 A | 2/2014 |
| JP | 2015088956 A | 5/2015 |

OTHER PUBLICATIONS

Office Action issued for counterpart Japanese Application No. 2017-554121, drafted by the Japan Patent Office on Oct. 7, 2019.
International Preliminary Report on Patentability for International Application No. PCT/JP2016/085454, issued by the International Bureau of WIPO dated Jun. 5, 2018.

DRIVING APPARATUS, LENS UNIT, DEVICE, AND CORRECTION METHOD FOR EXTERNAL DISTURBANCE MAGNETIC FIELD

The contents of the following Japanese patent application(s) are incorporated herein by reference:
NO. 2015-233680 filed in JP on Nov. 30, 2015, and
NO. PCT/JP2016/085454 filed on Nov. 29, 2016.

BACKGROUND

1. Technical Field

The present invention relates to a driving apparatus, a lens unit, a device, a correction method, and a computer readable recording medium.

2. Related Art

Conventionally, an optical module having a lens mounted on a digital camera, a mobile phone, a small-magnituded PC and the like has been configured to move, by an actuator and the like, a position of the lens and control the same to perform an optical camera shake correction and/or an auto-focus function and the like (for example, see Patent Documents 1 and 2).
[Patent Document 1] Japanese Patent Application Publication No. 2011-22563
[Patent Document 2] International Publication No. WO2013/171998

SUMMARY

For stable operation, such an optical module has performed a feedback control by using a detection result of the position of the lens. However, because the position of the lens has been detected based on a detection result of a magnetic field of a magnet that is fixed to the lens, if a disturbance magnetic field and the like generated on the outside of the optical module are input therein, an error in a position detection of the lens has occurred in some cases. In this way, if the error is included in the position detection of the lens, even when the feedback control is performed, the lens was not able to be moved to a position to be a target in some cases. Therefore, an optical module that stably operates the optical camera shake correction, the autofocus function and the like even if the disturbance magnetic field and the like are input has been desired.

GENERAL DISCLOSURE (Item 1) A driving apparatus may include an actuator that changes a relative position between a lens section and an imaging device. The driving apparatus may include a magnetic field detection section that detects magnetic field information corresponding to the relative position between the lens section and the imaging device. The driving apparatus may include a storage section that stores reference information that is based on an output of the magnetic field detection section when the lens section or the imaging device is positioned at a reference position. The driving apparatus may include a control section that controls a driving amount of the actuator based on the magnetic field information and the reference information.
(Item 2) The driving apparatus may include an actuator that moves the lens section which is movable in at least one direction of an optical axis direction and a direction different from the optical axis direction. The driving apparatus may include a magnetic field detection section that detects magnetic field information corresponding to a position of the lens section. The driving apparatus may include a storage section that stores reference information that is based on an output of the magnetic field detection section when the lens section is positioned at the reference position. The driving apparatus may include a control section that controls a driving amount of the actuator based on the magnetic field information and the reference information.
(Item 3) The reference information may be magnetic field information when the lens section is positioned at the reference position.
(Item 4) The storage section may store the reference information that is based on an output of the magnetic field detection section corresponding to a known magnetic field when the lens section is positioned at the reference position.
(Item 5) The reference information may be a difference between a detection result of the magnetic field detection section in an environment in which no disturbance exists and a detection result of the magnetic field detection section in an environment in which the disturbance exists.
(Item 6) The control section may cause the storage section to store, as the reference information, the magnetic field information output by the magnetic field detection section in a state in which the lens section is positioned at the reference position.
(Item 7) The driving apparatus may have a correction section that corrects the driving amount of the actuator based on the magnetic field information detected by the magnetic field detection section after the storage section stores the reference information and then the lens section is positioned at the reference position, and the reference information.
(Item 8) The correction section may correct the magnetic field information and output the corrected magnetic field information. The control section may control the driving amount of the actuator based on the corrected magnetic field information.
(Item 9) The driving apparatus may include an input section that inputs a control signal which specifies a target position of the lens section. The correction section may correct the control signal input from the input section.
(Item 10) The lens section may have a magnetic field generation section that generates a magnetic field. The magnetic field detection section may detect the magnetic field generated by the magnetic field generation section and output the magnetic field information.
(Item 11) The magnetic field detection section may output magnetic field information of a magnitude corresponding to a position of the lens section in one direction.
(Item 12) The lens section may be movable in at least one direction of an optical axis direction and a direction perpendicular to the optical axis direction.
(Item 13) The storage section may store the reference information supplied from the outside.
(Item 14) The driving apparatus may include a focus detection section that detects a focus state of the lens section. The driving apparatus may include an adjustment section that adjusts the driving amount of the actuator based on the focus state of the lens section.
(Item 15) The driving apparatus may include a device in which the magnetic field detection section and the control section are integrally formed.
(Item 16) A lens unit may include the lens section. The lens unit may include the driving apparatus according to any one of Items 1 to 15.

(Item 17) A correction method may include a step of storing reference information when a lens section is positioned at a reference position. The correction method may include a step of detecting magnetic field information corresponding to a position of the lens section. The correction method may include a step of controlling the driving apparatus based on the magnetic field information and the reference information.

(Item 18) The step of storing the reference information may be a step of storing, as the reference information, the magnetic field information detected according to a known magnetic field when the lens section is moved to the reference position.

(Item 19) The step of storing the reference information may have a step of moving the lens section to the reference position. The step of storing the reference information may be a step of storing, as the reference information, the magnetic field information detected according to a state in which the lens section is positioned at the reference position.

(Item 20) The step of storing the reference information may be a step of storing the reference information input from the outside.

(Item 21) The correction method may include a step of correcting the magnetic field information corresponding to the position of the lens section. The correction method may include a step of inputting a control signal that specifies a target position of the lens section. The step of controlling the driving apparatus may include a step of controlling the driving apparatus based on the corrected magnetic field information and the control signal.

(Item 22) The correction method may include a step of inputting a control signal that specifies a target position of the lens section. The correction method may include a step of correcting the input control signal. The step of controlling the driving apparatus may be a step of controlling the driving apparatus based on the corrected control signal and the magnetic field information.

(Item 23) The step of controlling the driving apparatus may include a step of moving the lens section to a specified position by using the driving apparatus after the correction. The step of controlling the driving apparatus may include a step of detecting the focus state of the lens section. The step of controlling the driving apparatus may include a step of further correcting the driving apparatus based on the focus state of the lens section.

(Item 24) A program is for making a computer perform the correction method according to any one of Items 17 to 23.

(Item 25) A device may include an input section that inputs position information of a lens section and reference information that is based on that the lens section is positioned at a reference position. The device may include a correction section that calculates a correction value for the position information of the lens section based on the reference information. The device may include an output section that outputs a corrected driving amount obtained by correcting the driving amount of the actuator based on the correction value.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
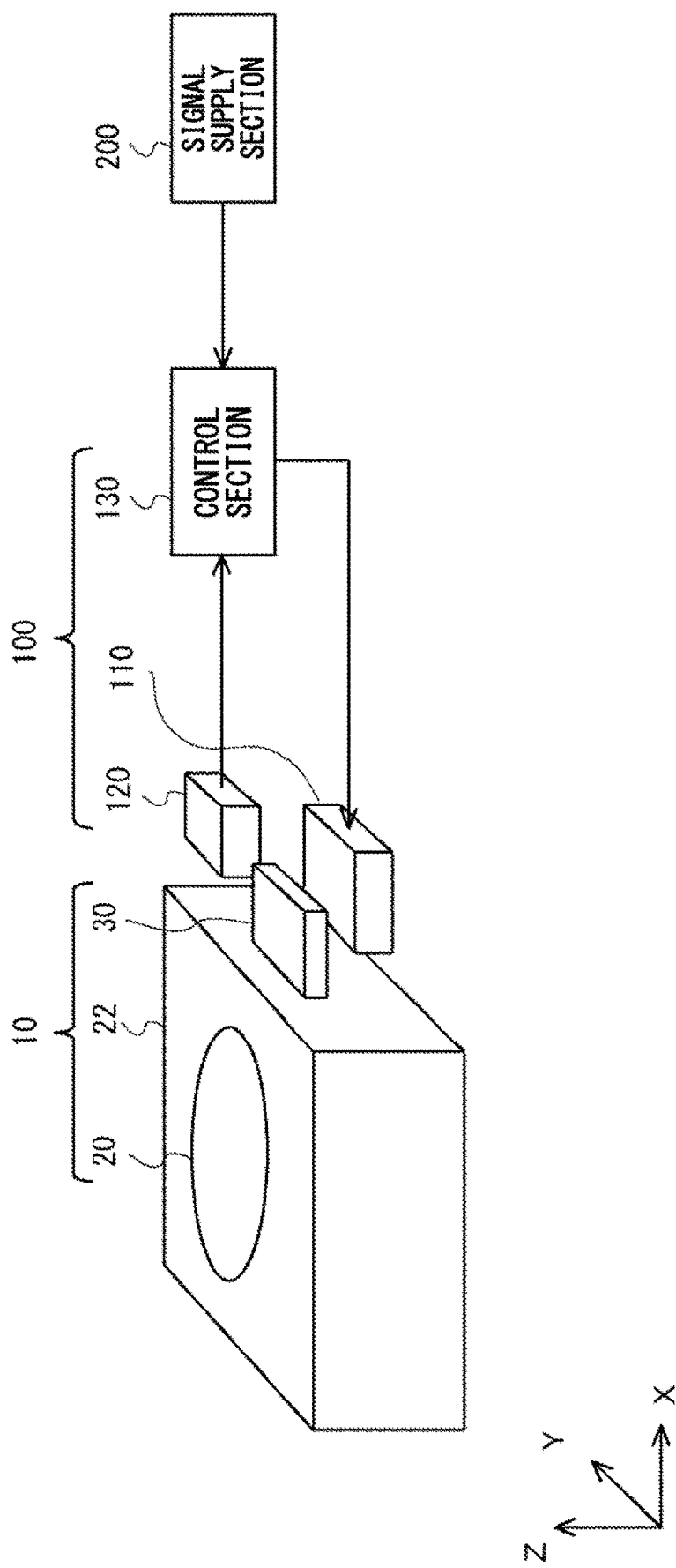
FIG. 1 shows a configuration example of a driving apparatus 100 according to the present embodiment together with a lens section 10 and a signal supply section 200.

FIG. 1 shows a configuration example of the driving apparatus 100 according to the present embodiment together with the lens section 10 and the signal supply section 200. The driving apparatus 100 supplies a drive signal to the lens section 10 based on a control signal supplied from the signal supply section 200 and a detection result of a position of the lens section 10 to control the position of the lens section 10.

Here, the lens section 10 is, as one example, an optical module that is movable in three directions (for example, X, Y, and Z directions) which are orthogonal to one another. The lens section 10 may be movable in an optical axis direction and/or a direction different from the optical axis direction. The lens section 10 may be movable in at least one direction of the optical axis direction and the direction different from the optical axis direction. Note that the direction different from the optical axis direction may be a direction that is approximately perpendicular to the optical axis direction of the lens section 10. The lens section 10 according to the present embodiment is driven by the driving apparatus 100 and moves in a predetermined direction. FIG. 1 shows an example in which the lens section 10 moves in a direction approximately identical to an optical axis direction of a lens 20 included in the lens section 10. The lens section 10 has the lens 20, a lens holder 22, and a magnetic field generation section 30.

The lens 20 refracts lights input from the outside and converges or diverges the lights on an imaging device, an image sensor section or the like. The lens 20 may be a convex lens or a concave lens, and may be formed including glass, plastic or the like. FIG. 1 shows an example in which the lens 20 is arranged approximately parallel to an XY plane, where the optical axis is approximately parallel to the Z direction.

The lens holder 22 mounts the lens 20 thereon. For example, by moving the lens holder 22 in the X, Y or Z direction, the position of the lens 20 is moved. By moving the lens holder 22 in the Z direction, the lens 20 is moved in a direction approximately identical to the optical axis direction, and an autofocus operation and the like of the lens section 10 may be performed. Also, by moving the lens holder 22 in the X direction and/or the Y direction, the lens 20 is moved to a direction approximately perpendicular to the optical axis direction, and the camera shake correction operation of the lens section 10 and the like may be performed.

The magnetic field generation section 30 generates a magnetic field. The magnetic field generation section 30 may include a permanent magnet. The magnetic field generation section 30 may be fixed to the lens holder 22, and in this case, the magnetic field generation section 30 is moved along with the movement of the lens holder 22. That is, at a certain position or a reference point on the outside of the lens section 10, the position of the lens holder 22 can be detected by detecting a magnitude of the magnetic field supplied by the magnetic field generation section 30.

The signal supply section 200 supplies, to the driving apparatus 100, a control signal that specifies the target position of the lens section 10. The signal supply section 200 may supply a control signal that is in proportion to a distance from a predetermined reference position to the target position of the lens section 10. The signal supply section 200 may supply, to the driving apparatus 100, the control signal according to a target value at which the lens section 10 should be positioned during a process of performing the autofocus operation, the camera shake correction operation and the like. Also, the signal supply section 200 may also supply the reference information to the driving apparatus 100. For the reference information, details are described below.

The driving apparatus 100 according to the present embodiment moves the lens section 10 to the target position based on the control signal received from such a signal supply section 200. The driving apparatus 100 includes an actuator 110, a magnetic field detection section 120, and a control section 130.

The actuator 110 moves the lens section 10. The actuator 110 may move the lens section 10 in one direction. The actuator 110 may move the lens section 10 in an optical axis direction of the lens section 10 and/or a direction different from the optical axis direction. The actuator 110 may move the lens section 10 in at least one direction of the optical axis direction of the lens section 10 and the direction different from the optical axis direction. Note that the direction different from the optical axis direction may be a direction approximately perpendicular to the optical axis direction of the lens section 10. The actuator 110 may move the lens section 10 by a magnetic force. The actuator 110 may have an electromagnet that includes one or more coils and generates a magnetic force by energizing the coil(s). As one example, the actuator 110 faces the magnetic field generation section 30 fixed to the lens section 10, and generates a magnetic force so as to attract or separate the magnetic field generation section 30 to move the lens section 10.

FIG. 1 shows an example in which the actuator 110 generates the magnetic force to move the lens section 10 in a +Z direction or a −Z direction. Instead of this, or in addition to this, the actuator 110 may move the lens section 10 in a direction approximately perpendicular to the optical axis direction of the lens 20. In this case, the lens section 10 may have a plurality of magnetic field generation sections, and a plurality of the actuators may be provided corresponding to the plurality of magnetic field generation sections. That is, a set of the actuators and the magnetic field generation sections may be provided in each direction in which the lens section 10 is to be moved to respectively move the lens section 10.

For example, for the lens section 10, if two magnetic field generation sections are provided corresponding to the X direction and the Y direction, two actuators are provided facing the two magnetic field generation sections. Each of the actuators can move the lens section 10 on the XY plane by causing corresponding electromagnets to respectively generate the magnetic force. That is, by further providing at least two sets of the magnetic field generation sections and the actuators to the lens section 10 and the driving apparatus 100 shown in FIG. 1, the lens section 10 can be moved three-dimensionally.

The magnetic field detection section 120 detects the magnetic field information corresponding to the position of the lens section 10. The magnetic field detection section 120 may detect the magnetic field generated from the lens section 10. As one example, the magnetic field detection section 120 detects the magnetic field generated by the magnetic field generation section 30, which is fixed to the lens section 10, and outputs the magnetic field information. The magnetic field detection section 120 may output magnetic field information of a magnitude corresponding to the position of the lens section 10 in one direction. For example, the magnetic field detection section 120 detects the magnetic field of the magnetic field generation section 30 to detect the position of the lens section 10 in the Z direction.

Also, if the actuator 110 moves the lens section 10 three-dimensionally, a plurality of the magnetic field detection sections 120 may be provided and may respectively detect the magnetic fields from the plurality of magnetic field generation sections provided corresponding to the X direction and the Y direction. The magnetic field detection section 120 may have a hall element, GMR (Giant Magneto Resistive) element, and/or an inductance sensor and the like. The magnetic field detection section 120 supplies the detected magnetic field information to the control section 130.

The control section 130 controls the driving amount of the actuator 110 based on the control signal received from the signal supply section 200 and the magnetic field information received from the magnetic field detection section 120. The control section 130 may control the actuator 110 so that the lens section 10 is positioned at a position corresponding to the control signal. That is, the control section 130 may perform, based on the detection result of the position of the lens section 10, the feedback control according to a closed loop so that the lens section 10 is moved to the position corresponding to the control signal. The control section 130 may provide the closed loop in each actuator 110, that is, in each direction in which the lens section 10 is to be moved to respectively control the actuators.

The control section 130 may control the driving amount of the actuator 110 by using a control parameter. As one example, the control section 130 controls the actuator 110 by using a PID controller (Proportional-Integral-Derivative Controller). In this case, the control section 130 may use, as the control parameter, a proportional gain, an integration gain, a differential gain and the like. Control section 130 may calculate the driving amount of the actuator 110 by a PID control circuit based on a digital signal, which is obtained by A/D converting the magnetic field information of the lens section 10 from the magnetic field detection section 120, and the control signal, and supply, to the actuator 110, a drive signal obtained by D/A converting the calculated driving amount.

As described above, the driving apparatus 100 moves the lens section 10 according to the control signal to control the position of the lens 20. For example, the driving apparatus 100 controls the position of the lens 20 in the optical axis direction (for example, the Z direction) according to the control signal to perform the autofocus function. Also, the driving apparatus 100 controls the position of the lens 20 on the XY plane or the three-dimensional position of the lens 20 according to the control signal to perform the camera shake correction function.

Because such a driving apparatus 100 detects the magnetic field generated from the magnetic field generation section 30 fixed to the lens section 10 to detect the position of the lens section 10, if a disturbance magnetic field and the like from the outside are input, an error in the detection of the position of the lens section 10 may occur. That is, a noise component is included in the magnetic field information detected by the magnetic field detection section 120, and an accurate position of the lens section 10 cannot be detected in some cases.

In this way, because when the accurate position of the lens section 10 cannot be detected, the control section 130 performs the feedback control based on the inaccurate position of the lens section 10, the lens section 10 cannot be moved to the position corresponding to the control signal. That is, the driving apparatus 100 cannot normally operate the optical camera shake correction, the autofocus function and the like.

Here, the driving apparatus 100 according to the present embodiment compares the detection result of the magnetic field from the lens section 10 to pre-detected reference information, and corrects the magnetic field information detected by the magnetic field detection section 120 according to the comparison result to reduce an influence of the disturbance magnetic field. For such a driving apparatus 100, details are described by using FIG. 2.

Figure 2:
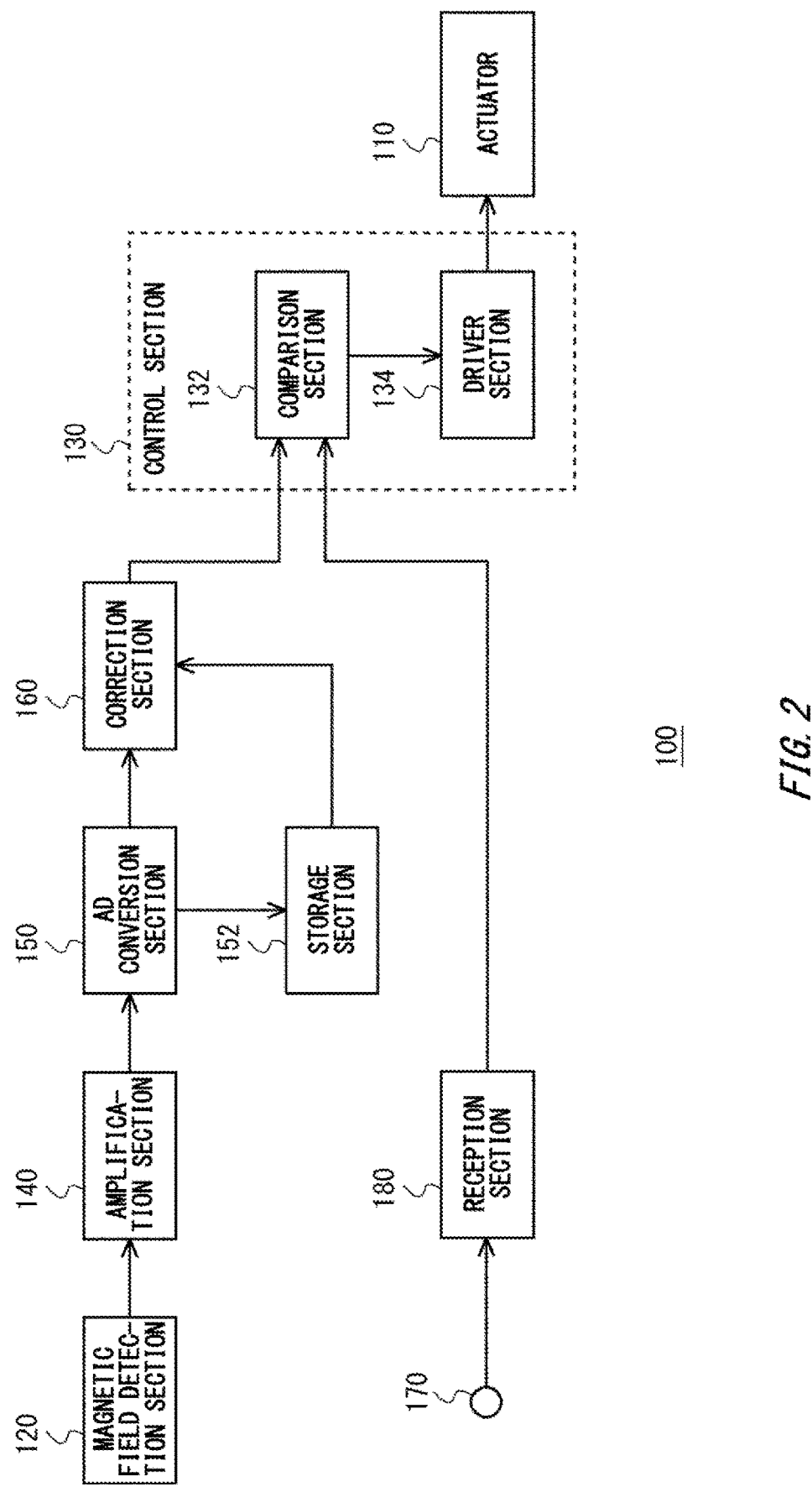
FIG. 2 shows a first configuration example of the driving apparatus 100 according to the present embodiment.

FIG. 2 shows a first configuration example of the driving apparatus 100 according to the present embodiment. In the driving apparatus 100 of the first configuration example, operations approximately identical to the operations of the driving apparatus 100 according to the present embodiment shown in FIG. 1 are provided with the same signs as those of the operations of the driving apparatus 100 according to the present embodiment shown in FIG. 1, and the description is omitted The driving apparatus 100 of the first configuration example further includes an amplification section 140, an AD conversion section 150, a storage section 152, a correction section 160, an input section 170, and a reception section 180.

The amplification section 140 amplifies the detection signal corresponding to the magnetic field information detected by the magnetic field detection section 120. The amplification section 140 may amplify a value of an amplitude voltage or current of the detection signal to one time or more. The amplification section 140 supplies the amplified signal to the AD conversion section 150. The AD conversion section 150 converts the amplified signal received from the amplification section 140 into a digital signal. The AD conversion section 150 supplies the converted digital signal to the correction section 160. Also, the AD conversion section 150 may also supply the converted digital signal to the storage section 152.

The storage section 152 stores the reference information when the lens section 10 is positioned at the reference position. Here, the reference position may be a predetermined position and may be an end portion in a movable range of the lens section 10. Also, the reference position may also be an initial position at which the lens section 10 is positioned when the supply of the drive signal to the actuator 110 is stopped. Further, a plurality of the reference positions may also be provided.

Also, the storage section 152 may store, as the reference information, the information output by the magnetic field detection section 120 according to a known magnetic field when the lens section 10 is positioned at the reference position. The storage section 152 may store the information output by the magnetic field detection section 120 according to a plurality of known magnetic fields and/or a plurality of reference positions. Also, the storage section 152 may also store an arithmetic operation result of the information output by the magnetic field detection section 120. As the above-described arithmetic operation result, an example may include an arithmetic operation result using the plurality of reference information or an arithmetic operation result using the reference information and a specific value, for example. As the above-described arithmetic operation, a sum, a difference and the like may be included, for example.

Note that the information stored by the storage section 152 may be converted into a predetermined form. For example, the storage section 152 may also convert the information output by the magnetic field detection section 120 described above into a position code value corresponding to the position of the lens section 10 and store the position code value.

Here, if the disturbance magnetic field and the like are almost not input in the lens section 10, a sum of the magnetic fields input from a magnetic material and the like arranged around the lens section 10, and a sum of magnetic fields generated by the magnetic field generation section 30 may be taken as the known magnetic fields. Also, if the lens section 10 is positioned at the reference position, a magnetic field detected by the magnetic field detection section 120 according to the disturbance magnetic field being input may also be separately taken as the known magnetic field.

Also, a difference of the magnetic fields between the environment in which no disturbance exists and the environment when the disturbance exists in a case where the lens section 10 is positioned at the reference position described above may be taken as the known magnetic field. Also, a plurality of the reference positions of the lens section 10 may be set, the magnetic field at each lens position may be detected, the disturbance magnetic field at each lens position may be interpolated by using a plurality of the detected magnetic field information, and the interpolated disturbance magnetic field may also be taken as the known magnetic field.

Also, if the magnitude of the disturbance magnetic field or the like is less than a magnetic field detecting sensitivity of the magnetic field detection section 120 or is equal to or less than a reference value, the storage section 152 may store, as the reference information, the magnetic field information detected by the magnetic field detection section 120 according to the reference position of the lens section 10. Also, if there is almost no variation in the disturbance magnetic field and the like, the information for correcting the disturbance, such as the reference information, may also be a fixed value or a value including a partial arithmetic operation. With respect to this, the following implementation example is also similar.

The correction section 160 corrects the digital signal received from the AD conversion section 150 and supplies the corrected signal to the control section 130. The correction section 160 corrects the magnetic field information detected by the magnetic field detection section 120 based on the reference information stored in the storage section 152. That is, the correction section 160 corrects the driving amount of the actuator 110 based on the magnetic field information detected by the magnetic field detection section 120 after the storage section 152 stores the reference information and then the lens section 10 is positioned at the reference position, and the reference information. The correction section 160 corrects the magnetic field information and outputs the corrected magnetic field information to the control section 130. Here, the correction section 160 may also scale and use the reference information that is the disturbance magnetic field information stored in the storage section 152. Also, the correction section 160 may also subtract the reference information that is the disturbance magnetic field information from the digital signal received from the AD conversion section 150, and then scale the reference information.

The input section 170 inputs the control signal that specifies the target position of the lens section 10. The input section 170 inputs the control signal supplied from the signal supply section 200 on the outside of the driving apparatus 100. The input section 170 may input an electrical signal, a radio wave signal or the like. Note that the input section 170 may have an antenna and the like for inputting the radio wave signal. The input section 170 supplies the control signal to the control section 130 via the reception section 180.

The reception section 180 receives the control signal. If the control signal is sent in a specified communication manner, the reception section 180 may receive the control signal according to the communication manner. The reception section 180 receives the sent control signal in a serial communication manner, a parallel communication manner, a network, a radio communication manner, or the like, for example. As one example, the reception section 180 receives the control signal sent in an I2C (Inter-Integrated Circuit) manner. The reception section 180 supplies the received control signal to the control section 130.

The control section 130 controls the driving amount of the actuator 110 based on the magnetic field information corrected by the correction section 160. That is, the control section 130 controls the driving amount of the actuator 110 based on the magnetic field information and the reference information. Also, the control section 130 controls the driving amount of the actuator 110 so that the lens section 10 is moved to the position corresponding to the control signal supplied from the reception section 180. The control section 130 includes a comparison section 132 and a driver section 134.

The comparison section 132 compares the corrected magnetic field information to the control signal and outputs the comparison result. The comparison section 132 may also multiply the comparison result by a constant and then output the comparison result. The comparison section 132 may include a differential amplification circuit. The comparison section 132 may include the PID controller. The comparison section 132 supplies the comparison result to the driver section 134.

The driver section 134 outputs the drive signal of the actuator 110 based on the comparison result of the corrected magnetic field information and the control signal. For example, if the comparison result is almost zero, the driver section 134 maintains the drive signal being output. That is, if the control signal corresponding to the target position of the lens section 10 approximately matches the magnetic field information corresponding to the detection position of the lens section 10, the driver section 134 may determine that the lens section 10 has been positioned at the target position and maintain the drive signal of the actuator 110.

Also, if the comparison result is different from almost zero, the driver section 134 changes the drive signal being output. If the comparison result is larger than zero, the driver section 134 may change the drive signal to a greater one. The driver section 134 changes the drive signal so that an absolute value of the comparison result is close to zero.

As described above, the control section 130 according to the present embodiment operates so that the magnetic field information corresponding to the detection position of the lens section 10 approximately matches the magnetic field information corresponding to the target position of the lens section 10. Here, the correction section 160 corrects the magnetic field information so as to reduce the influence of the disturbance magnetic field. Accordingly, the control section 130 operates so that the detection position of the lens section 10, at which the influence of the disturbance magnetic field is reduced, approximately matches the target position of the lens section 10. The operation of such a driving apparatus 100 is described next.

Figure 3:
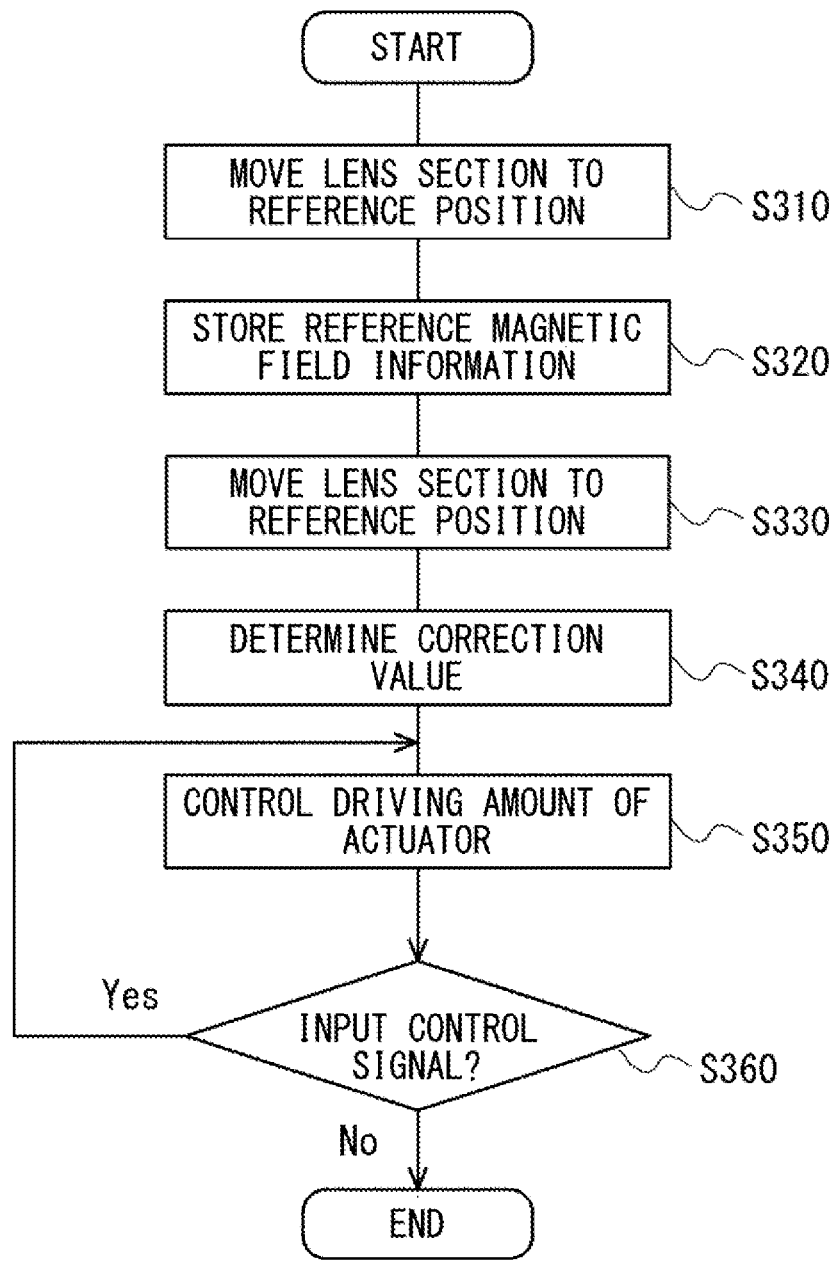
FIG. 3 shows one example of an operation flow of the driving apparatus 100 according to the present embodiment.

FIG. 3 shows one example of an operation flow of the driving apparatus 100 according to the present embodiment. By performing the operation flow shown in FIG. 3, the driving apparatus 100 moves the lens section 10 to the position corresponding to the control signal supplied from the outside even if the disturbance magnetic field is input therein.

First, the control section 130 moves the lens section 10 to the reference position (S310). The control section 130 may move the lens section 10 using an end point of an upper limit and/or a lower limit of a movable range of the actuator 110 as the reference position.

Next, the storage section 152 stores, as the reference information, the magnetic field information detected according to the known magnetic field when the lens section 10 is positioned at the reference position (S320). The storage section 152 may store, as the reference information, the magnetic field information detected by the magnetic field detection section 120 in a state in which the disturbance magnetic field and the like are almost not input in the lens section 10.

For example, if the lens section 10 is mounted on an apparatus or the like, a sum of the magnetic fields input in the lens section 10 from other members mounted on the apparatus is taken as the known magnetic field. Also, the storage section 152 stores, as the reference information, the magnetic field information output by the magnetic field detection section 120 in a state in which the disturbance magnetic field is not input in the apparatus. Note that the state in which the disturbance magnetic field is almost not input may be a state before product shipment and a state before the apparatus actually performs functions, such as the autofocus function, and the like. In the present embodiment, such a state is taken as an initial state.

Next, the driving apparatus 100 detects a change of the disturbance magnetic field from the initial state in an actual operation state of the lens section 10. Here, the actual operation state may be a state in which when the lens section 10 is mounted on the apparatus or the like, the apparatus actually operates after the shipment. Or, the actual operation state may also be a state immediately before the apparatus actually performs the functions, such as the autofocus function, and the like. The control section 130 moves the lens section 10 to the reference position after the reference information is stored in the storage section 152 (S330). Here, if two end points of the upper limit and of the lower limit of the movable range of the actuator 110 are taken as the reference positions, the control section 130 may move the lens section 10 to the two reference positions sequentially.

Next, the correction section 160 determines a correction value to correct the driving amount of the actuator 110 based on the magnetic field information detected by the magnetic field detection section 120, where the lens section 10 is positioned at the reference position, and the reference information stored in the storage section 152 (S340). The correction section 160 may take a difference between the magnetic field information in the actual operation state and the reference information in the initial state as a change caused by the disturbance magnetic field, and may take the difference as the correction value. Note that because the disturbance information is obtained if the operation of the correction section 160 is performed only once in the initial period, the operation of the correction section 160 may not be performed after the initial period. Instead of this, the operation of the correction section 160 may also be performed after the initial period to also correspond to the change of the disturbance magnetic field.

Here, when the control section 130 sequentially moves the lens section 10 using the two end points of the movable range of the actuator 110 as the reference positions, the correction section 160 may respectively obtain differences between the magnetic field information and the reference information at the two reference positions. In this case, the correction section 160 may take an average value of the two differences as the correction value. Also, the correction section 160 may take a difference $d_1$ obtained at one end point $x_1$ as a coordinate $D_1$ $(x_1, d_1)$, a difference $d_2$ obtained at the other end point $x_2$ as a coordinate $D_2$ $(x_2, d_2)$, and a straight line passing $D_1$ and $D_2$ as a correction straight line $D(x)$ relative to a position x of the lens section 10. That is, the correction section 160 may take the correction value for the lens section 10 at the position x as a value $D(x)$ on the correction straight line.

Next, the control section 130 controls the driving amount of the actuator 110 by using the correction value determined based on the magnetic field information and the reference information (S350). For example, the control section 130 moves the lens section 10 according to the control signal supplied to the input section 170 from the signal supply section 200 on the outside of the driving apparatus 100. The magnetic field detection section 120 detects the magnetic field information corresponding to the position of the moved lens section 10. Next, the correction section 160 corrects the magnetic field information corresponding to the position of the lens section 10 by using the correction value. As one example, the correction section 160 may subtract the correction value from the magnetic field information so as to reduce the influence of the disturbance magnetic field.

Next, the control section 130 controls the driving amount of the actuator 110 based on the corrected magnetic field information output from the correction section 160 and the control signal. The control section 130 compares the corrected magnetic field information to the control signal and changes the drive signal so that the absolute value of the comparison result is close to zero. The driving apparatus 100 may repeat the movement, the position detection and the correction of the lens section 10 by the closed loop to stabilize the position of the lens section 10. As described above, because the driving apparatus 100 compares the initial state of the lens section 10 to the actual operation state of the lens section 10 to determine the correction value to correct the influence of the disturbance magnetic field and reduces the influence of the disturbance magnetic field by using the correction value, the driving apparatus 100 can move the lens section 10 to the target position corresponding to the control signal and stabilize the lens section 10. In the above, the example in which the control section 130 performs the closed loop control by using the magnetic field information detected by one magnetic field detection section 120 has been described; however, instead of this, a plurality of the magnetic field detection sections 120 may be provided and the control section 130 may also perform the closed loop control on an arithmetic operation result of detection results of the plurality of magnetic field detection sections 120.

If a next control signal from the signal supply section 200 is supplied to the input section 170 (S360: Yes), the control section 130 repeats the operation at S350 and moves the lens section 10 to the target position corresponding to the next control signal. Here, the correction section 160 may correct the magnetic field information by using the correction value or the correction straight line which is approximately identical to the former one. Instead of this, the correction section 160 may also determine a new correction value and then correct the magnetic field information. In this case, if the next control signal from the signal supply section 200 is supplied to the input section 170 (S360: Yes), the driving apparatus 100 may return to S330, determine the correction value and then move the lens section 10. If the control signal from the signal supply section 200 is not supplied to the input section 170 (S350: No), the control section 130 may end the movement of the lens section 10.

As described above, because the driving apparatus 100 according to the present embodiment corrects the detection result of the position of the lens section 10 so that the influence of the disturbance magnetic field is reduced even if the disturbance magnetic field and the like are input therein, the driving apparatus 100 can move the lens section 10 to the target position by the feedback control. Accordingly, the driving apparatus 100 can stably operate the optical camera shake correction, the autofocus function and the like even if the disturbance magnetic field and the like are input therein.

Figure 4:
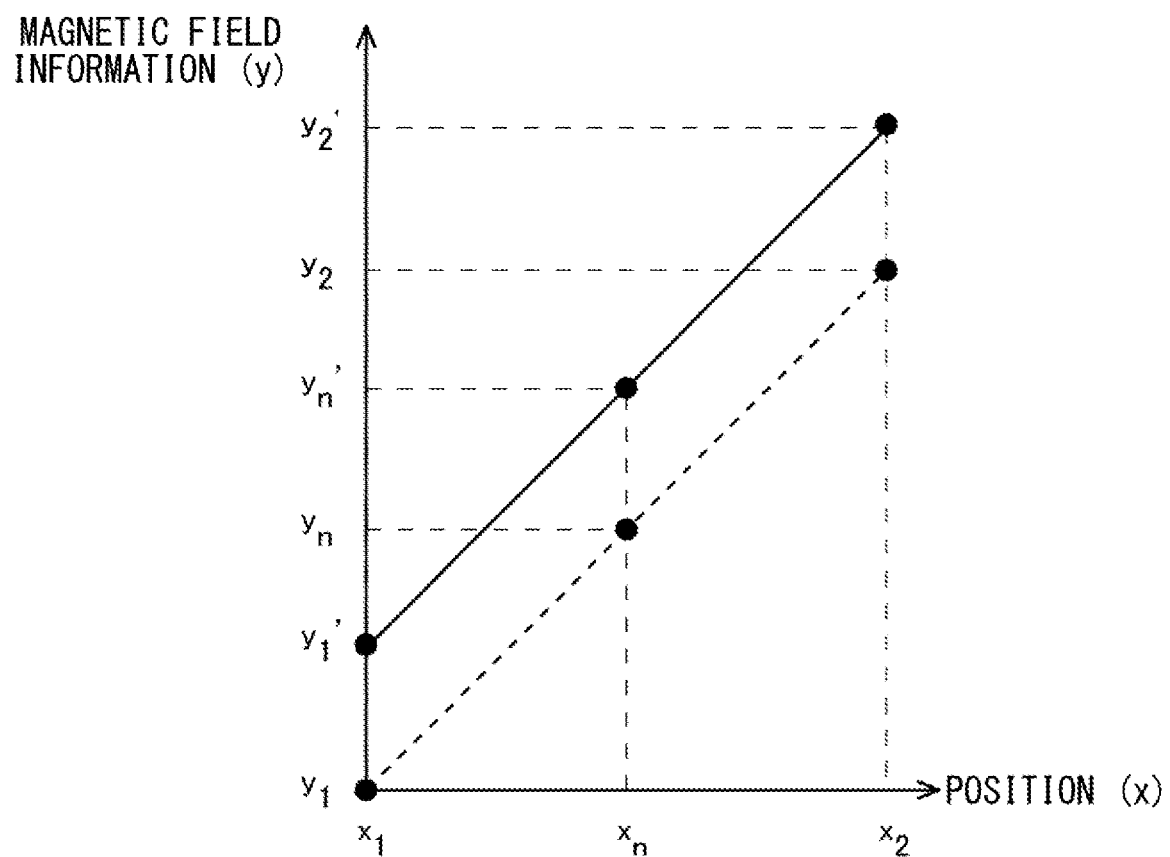
FIG. 4 shows one example of magnetic field information detected by a magnetic field detection section 120 relative to a position of the lens section 10 according to the present embodiment.

FIG. 4 shows one example of the magnetic field information detected by the magnetic field detection section 120 relative to the position of the lens section 10 according to the present embodiment. In FIG. 4, the horizontal axis indicates a relative position of the lens section 10, and the vertical axis indicates examples of the detection result of the magnetic field information obtained by the magnetic field detection section 120. As one example, the magnetic field detection section 120 detects the magnetic field information that is an approximately linear relation (a good linearity) relative to the position of the lens section 10. In this way, if the magnetic field detection section 120 detects the magnetic field information with a good linearity, the magnetic field information detected by the magnetic field detection section 120 relative to the position of the lens section 10 is a response that can be a straight line as the dotted line in FIG. 4 or can be approximated to the straight line.

Also, if an electromagnet or the like close to the lens section 10 is switched on, or if the lens section 10 is close to a motor, a speaker, a magnetic field generation section and the like, a certain disturbance magnetic field is applied to the lens section 10. The magnetic field information detected by the magnetic field detection section 120 relative to the position of the lens section 10 in this case is shown by the solid line in FIG. 4, as one example.

In this way, if the disturbance magnetic field is applied to the lens section 10, the magnetic field detection section 120 shows a response in which an offset is added to the magnetic field generated by the magnetic field generation section 30. That is, even if magnetic field information $y_n$ relative to the target position $x_n$ is calculated based on the straight line passing the point $(x_1, y_1)$ and the point $(x_2, y_2)$, an error from the magnetic field information $y_n'$ detected by the magnetic field detection section 120 occurs. Therefore, even if the magnetic field information $y_n$ is supplied to the driving apparatus 100 as the control signal, the driving apparatus 100 cannot move the lens section 10 to the target position $x_n$.

Here, the driving apparatus 100 according to the present embodiment obtains in advance, as the reference information, the detection result relative to one or more reference positions in a state in which the disturbance magnetic field does not occur. Also, the correction section 160 compares the detection result of the magnetic field detection section 120 in the actual operation state to the reference information to determine the correction value. For example, in the example of FIG. 4, the lens section 10 is moved to the end point $x_1$, and the correction section 160 calculates the difference $d_1 = y_1' - y_1$, where the difference $d_1$ is a difference between reference information $y_1$ in the initial state and magnetic field information $y_1'$ in the actual operation state, and determines the correction value as $d_1$. The correction section 160 may perform the correction so that the corrected magnetic field information is a response, relative to the position of the lens section 10, in a state in which the disturbance magnetic field does not occur.

As one example, the correction section 160 corrects the response of the magnetic field detection section 120 shown by the solid line in FIG. 4 to become the response shown by the dotted line in FIG. 4. That is, the correction section 160 subtracts the correction value $d_1$ from the magnetic field information $y_n'$ detected by the magnetic field detection section 120 relative to the target position $x_n$, corrects the magnetic field information $y_n'$ so as to be close to the magnetic field information $y_n$, and outputs the corrected magnetic field information $y_n'$. Accordingly, the driving apparatus 100 can perform an operation similar to the operation when the disturbance magnetic field is not input therein, and output a proper drive signal of the actuator 110. That is, similar to the state before the disturbance magnetic field is input in the lens section 10, by supplying the magnetic field information $y_n$ to the driving apparatus 100 as the control signal, the driving apparatus 100 can move the lens section 10 to the target position $x_n$.

As described above, the example in which the correction section 160 in the driving apparatus 100 according to the present embodiment corrects the digital signal output by the AD conversion section 150 so that the influence of the disturbance magnetic field is reduced has been described. Instead of this, the correction section 160 may also correct the magnetic field information during the process in which the AD conversion section 150 converts the input signal into the digital signal. In this case, the correction section 160 may correct a conversion parameter used by the AD conversion section 150 for converting a signal into the digital signal, a correction parameter, and/or an offset parameter and the like to perform the correction so that the output of the AD conversion section 150 becomes a response shown by the dotted line in FIG. 4.

Instead of this, the driving apparatus 100 may also correct the analog signal input in the AD conversion section 150. In this case, the correction section 160 that corrects the analog signal may be provided on the input side and/or the output side of the amplification section 140. Also, the input/output response of the amplification section 140 may also be corrected. Also, the driving apparatus 100 may also combine these corrections.

Figure 5:
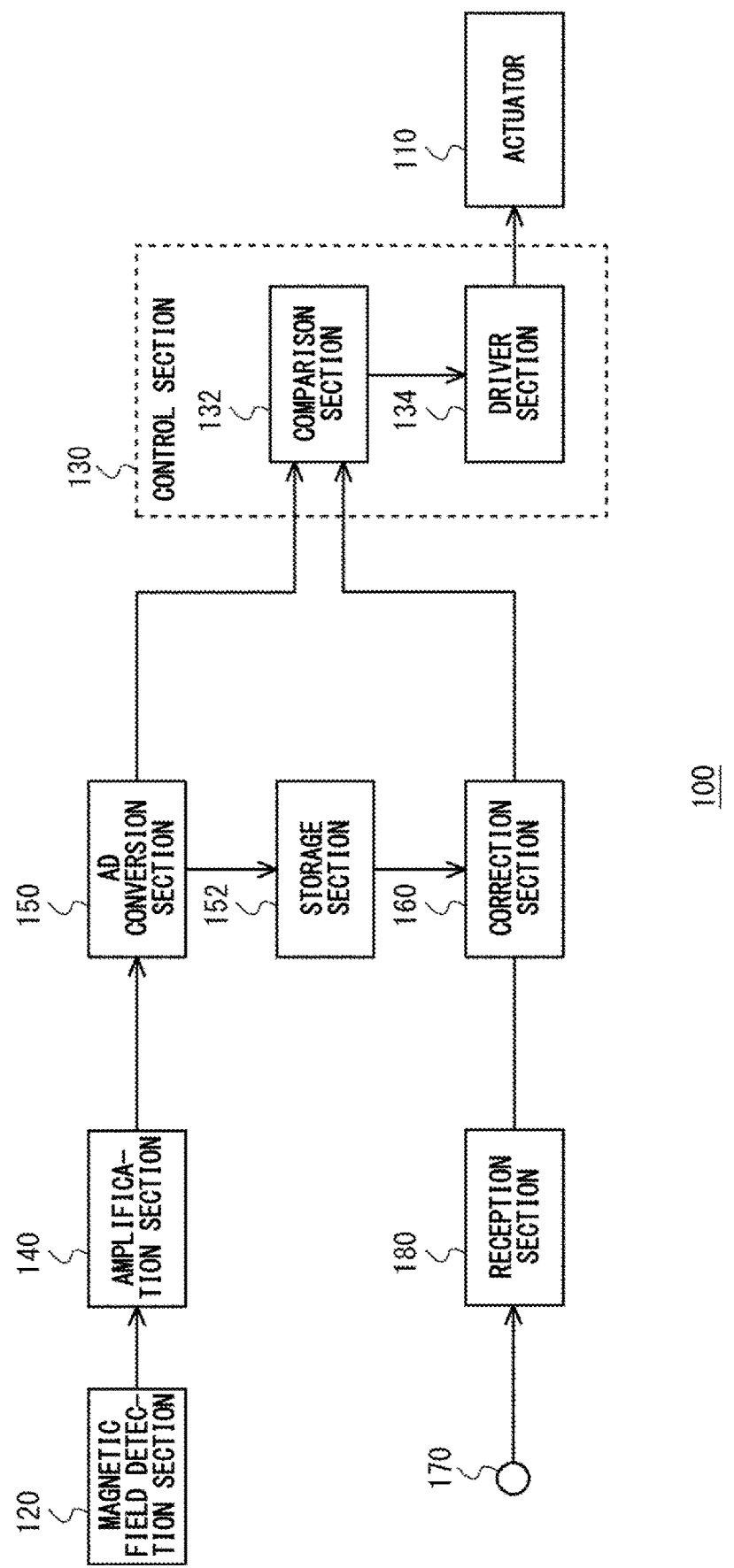
FIG. 5 shows a second configuration example of the driving apparatus 100 according to the present embodiment.

Instead of this, the driving apparatus 100 may also correct the control signal. For such a driving apparatus 100, details are described by using FIG. 5. FIG. 5 shows a second configuration example of the driving apparatus 100 according to the present embodiment. In the driving apparatus 100 of the second configuration example, operations approximately identical to the operations of the driving apparatus 100 according to the present embodiment shown in FIG. 2 are provided with the same signs as those of the operations of the driving apparatus 100 according to the present embodiment shown in FIG. 2, and the description is omitted. The driving apparatus 100 of the second configuration example corrects the control signal supplied from the signal supply section 200 on the outside.

That is, the correction section 160 of the second configuration example communicates with the input section 170, receives the control signal input from the input section 170, corrects the control signal, and supplies the corrected control signal to the control section 130. The correction section 160 corrects the control signal input from the input section 170 and outputs the corrected control signal. The correction section 160 corrects the supplied control signal, where the response of the magnetic field detection section 120, for example, as shown by the dotted line in FIG. 4 is assumed, so that the control signal becomes the response as shown by the solid line in FIG. 4. For example, if the signal supply section 200 supplies the magnetic field information $y_n$ to the driving apparatus 100 as the control signal to move the lens section 10 to the target position $x_n$, the correction section 160 corrects the control signal $y_n$ to $y_n'$. In this case, the correction section 160 adds the correction value $d_1$ to the control signal $y_n$, as one example. In the above, the example in which the control section 130 uses the magnetic field information detected by one magnetic field detection section 120 has been described; however, instead of this, a plurality of the magnetic field detection sections 120 may be provided and the control section 130 may also perform the closed loop control on an arithmetic operation result of the detection results of the plurality of magnetic field detection sections 120.

Accordingly, if the lens section 10 is positioned at the position $x_n$, the magnetic field information $y_n'$ detected by the magnetic field detection section 120 can be set to a value approximately identical to a value of a control signal $y_n + d_1$ obtained by correcting, by the correction section 160, the control signal corresponding to the target value $x_n$. Therefore, the control section 130 can cause the lens section 10 to be positioned at the target position $x_n$ by controlling the driving amount of the actuator 110 based on the corrected control signal and the magnetic field information.

In this way, the correction section 160 corrects the control signal so that the relation of the control signal relative to the target position of the lens section 10 becomes a response approximately identical to the response of the magnetic field information detected by the magnetic field detection section 120 relative to the position of the lens section 10. Accordingly, because the control signal corresponding to the approximately identical position $x_n$ and the magnetic field information are set to be approximately identical to each other, the comparison result of the comparison section 132 in this case is almost zero, and the driver section 134 can supply the drive signal so as to maintain the lens section 10 at the target position $x_n$.

Figure 6:
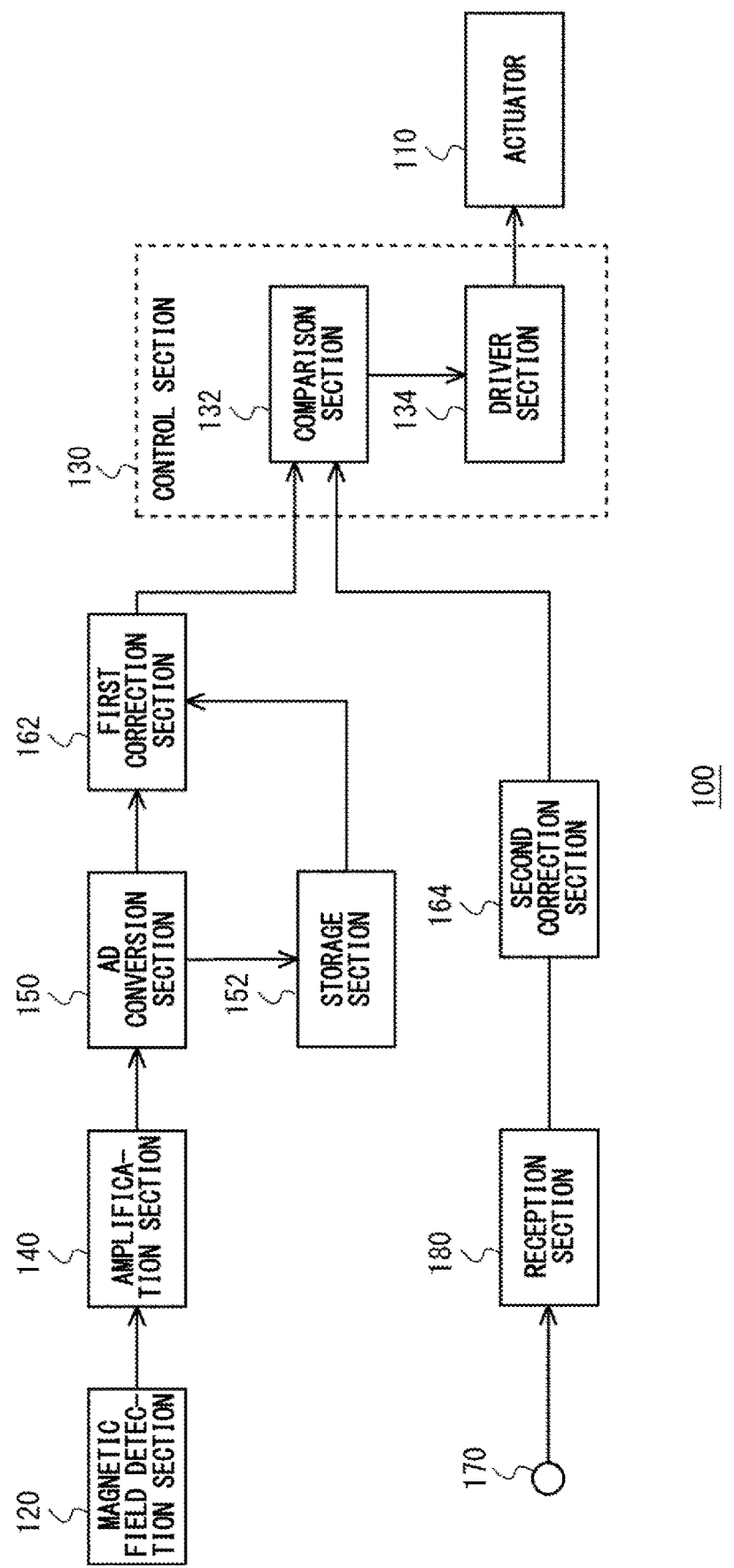
FIG. 6 shows a third configuration example of the driving apparatus 100 according to the present embodiment.

The above has described that the driving apparatus 100 according to the present embodiment corrects the magnetic field information or the control signal. Instead of this, the driving apparatus 100 may also correct the magnetic field information and the control signal. Such a driving apparatus 100 is described using FIG. 6. FIG. 6 shows a third configuration example of the driving apparatus 100 according to the present embodiment. In the driving apparatus 100 of the third configuration example, operations approximately identical to the operations of the driving apparatus 100 according to the present embodiment shown in FIG. 2 and FIG. 5 are provided with the same signs as those of the operations of the driving apparatus 100 according to the present embodiment shown in FIG. 2 and FIG. 5, and description is omitted.

The first correction section 162 may correct the magnetic field information, as described in FIG. 2. In this case, the second correction section 164 may further correct the control signal input from the input section 170. The second correction section 164 corrects an output level of the magnetic field information, as one example. Here, the response of the magnetic field information detected by the magnetic field detection section 120 relative to the position of the lens section 10 may change according to the output level of the magnetic field information. In this case, the first correction section 162 may correct the magnetic field information according to the correction value to correct, by the second correction section 164, the control signal.

Instead of this, the second correction section 164 may correct the control signal input from the input section 170, as described in FIG. 5. In this case, the first correction section 162 may further correct the magnetic field information. That is, the first correction section 162 corrects the output level of the magnetic field information, as one example. Also, the second correction section 164 may correct the control signal according to the correction value to correct, by the first correction section 162, the magnetic field information.

Instead of this, the first correction section 162 and the second correction section 164 may also respectively correct the magnetic field information and the control signal. For example, the first correction section 162 corrects the magnetic field information by using a first correction value if the position of the lens section 10 is within a range of a first area, and the second correction section 164 corrects the control signal by using a second correction value, which is different from the first correction value, if the position of the lens section 10 is within a range of a second area. Also, at least one of the first correction section 162 and the second correction section 164 may also further correct the output level. The driving apparatus 100 can perform various corrections by having a plurality of correction sections.

Figure 7:
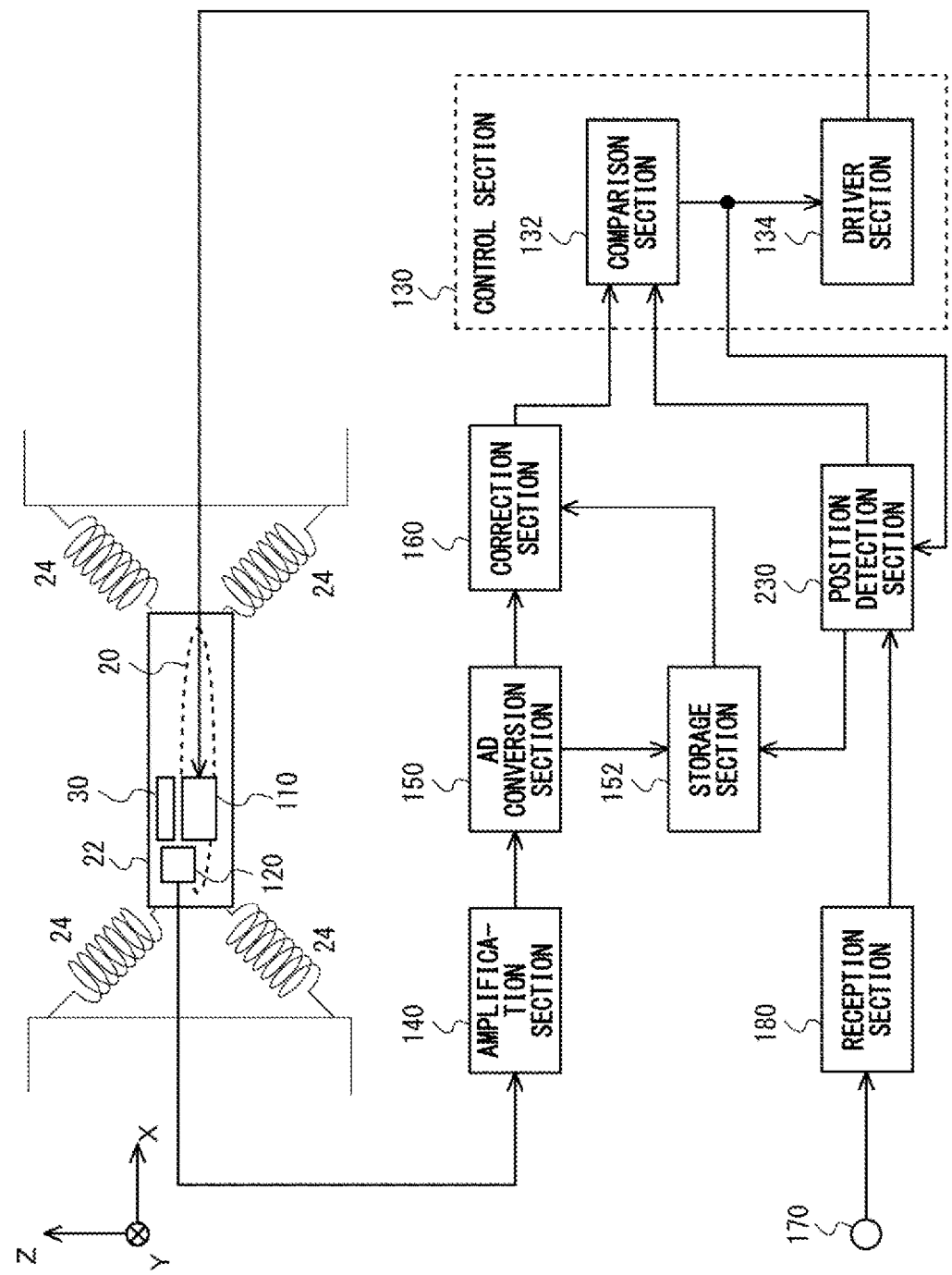
FIG. 7 shows a fourth configuration example of the driving apparatus 100 according to the present embodiment.

FIG. 7 shows a fourth configuration example of the driving apparatus 100 according to the present embodiment. The driving apparatus 100 of the fourth configuration example drives a spring-type lens section 10. The lens section 10 further includes an elastic body 24, and one end of the elastic body 24 is connected to the lens holder 22 and the other end of the elastic body 24 is fixed, as one example. In this case, the actuator 110 moves the position of the lens section 10 to a position corresponding to a driving force corresponding to the driving amount of the control section 130, and an elastic force of the elastic body 24. That is, the lens holder 22 is moved to the position at which the elastic force of the elastic body 24 and the driving force of the actuator 110 are balanced with each other.

In such a spring-type lens section 10 as well, the driving apparatus 100 obtains, as the reference information, the detection result relative to one or more reference positions in the state in which the disturbance magnetic field does not occur. Also, the correction section 160 compares the detection result of the magnetic field detection section 120 in the actual operation state to the reference information to determine the correction value. Accordingly, the correction section 160 can perform the correction so that the corrected magnetic field information becomes a response, relative to the position of the lens section 10, in the state in which the disturbance magnetic field does not occur.

Note that because the spring-type lens section 10 is moved to the position corresponding to the driving force of the actuator 110, the position of the lens section 10 can be detected according to the drive signal supplied to the actuator 110. Therefore, the driving apparatus 100 may also further include a position detection section 230 that detects the position of the lens section 10.

That is, the position detection section 230 detects the position of the lens section 10 according to the input signal of the driver section 134. Note that the position detection section 230 may also receive the drive signal of the actuator 110 that is the output of the driver section 134 to detect the position of the lens section 10.

Because the position detection section 230 can detect the position of the lens section 10, a correction value can be generated so that the position of the lens section 10 matches the control signal. That is, the position detection section 230 may receive the control signal corresponding to the target position input from the input section 170 and further add, to the control signal, the correction value corresponding to a difference between the target position and the position of the lens section 10. Also, the position detection section 230 may also cause the storage section 152 to store the correction value corresponding to the difference between the target position and the position of the lens section 10.

In this way, the driving apparatus 100 of the fourth configuration example can obtain the correction result obtained by the correction section 160 as the position information of the position detection section 230. Therefore, in addition to the correction according to the reference information, the correction section 160 may also further perform a correction that is based on the position information of the position detection section 230 to perform a fine adjustment on the position of the lens section 10. Accordingly, the driving apparatus 100 can calibrate the correction value without using a position detection apparatus that detects the position of the lens section 10 by using laser light and the like.

That is, according to the control signal being supplied, the driving apparatus 100 can drive the actuator 110 while calibrating the control signal. Note that the example in which the position detection section 230 of the driving apparatus 100 shown in FIG. 7 corrects the control signal has been described; however, instead of this, the position detection section 230 may also correct the magnetic field information. Also, the position detection section 230 may also respectively correct the control signal and the magnetic field information. Instead of this, the position detection section 230 may also supply the correction value that is based on the position information to the correction section 160 to cause the correction section 160 to correct.

The driving apparatus 100 according to the present embodiment described above moves the lens section 10 to the position specified by the control signal to stably perform the autofocus function and the camera shake correction function. As one example, such an autofocus function measures a distance between an object and the lens section 10 by using infrared light, an ultrasonic wave or the like, and determines the position of the lens section 10 according to the measurement result. Therefore, due to a measurement error of the distance, a movement of the object, a determination algorithm of the position of the lens section 10 and the like, the focus position of the lens 20 may not match the intended position of the object even if the driving apparatus 100 moves the lens section 10 to the position corresponding to the control signal.

Figure 8:
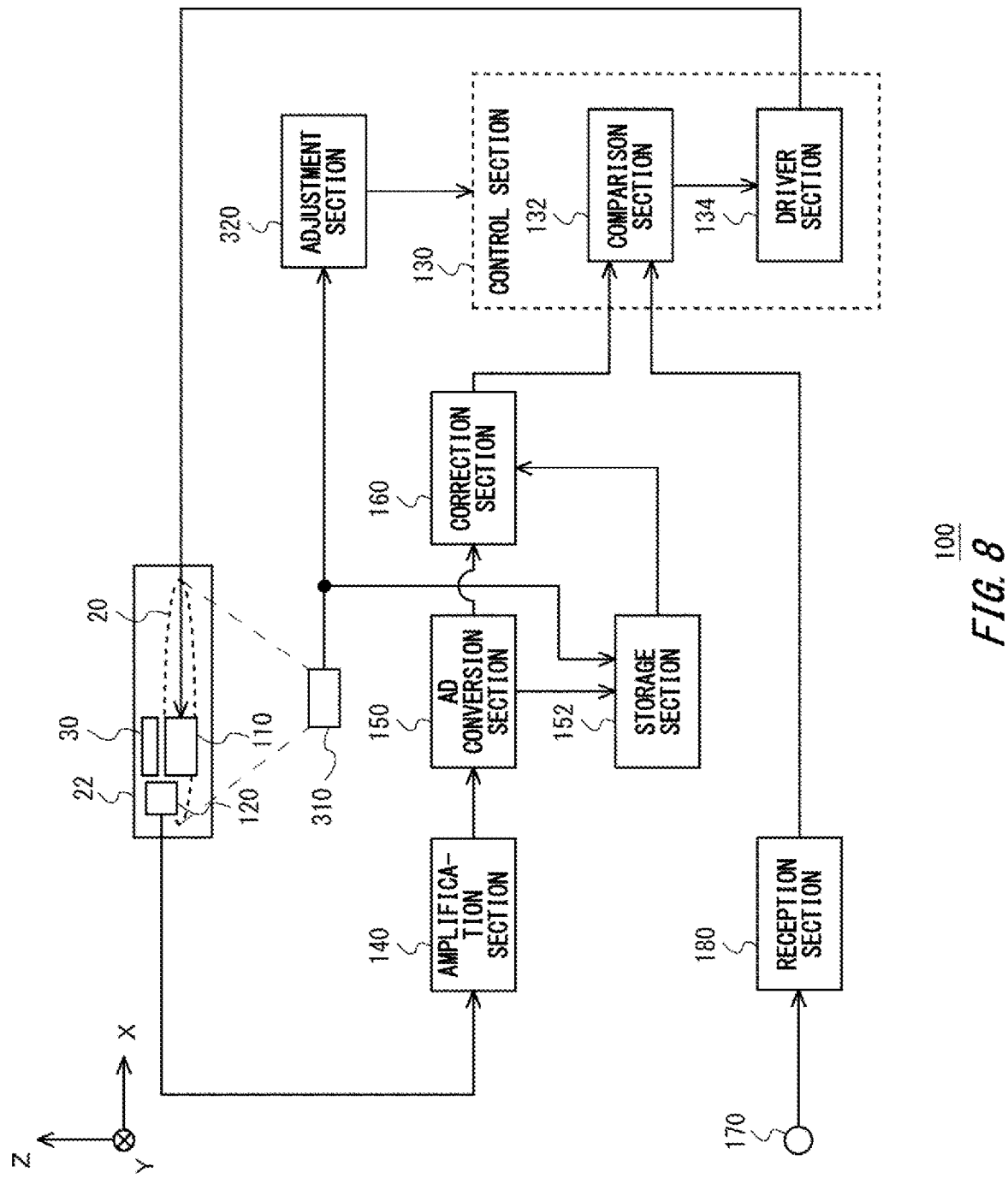
FIG. 8 shows a fifth configuration example of the driving apparatus 100 according to the present embodiment.

Here, the driving apparatus 100 may also further perform a fine adjustment on the focus position of the lens 20 after the lens section 10 is moved to the position specified by the control signal. For such a driving apparatus 100, details are described by using FIG. 8. FIG. 8 shows a fifth configuration example of the driving apparatus 100 according to the present embodiment. The driving apparatus 100 of the fifth configuration example further includes a focus detection section 310 and an adjustment section 320.

The focus detection section 310 detects the focus state of the lens section 10. The focus detection section 310 detects the focus position of the lens 20 after the control section 130 drives the actuator 110 and moves the lens section 10. The focus detection section 310 may detect the focus position based on an image obtained by the lens 20 by a phase difference detection method, a contrast detection method and the like. The focus detection section 310 may detect, as the focus state, a focus error between the focus position of the lens 20 moved to the specified position, and the object.

The adjustment section 320 adjusts the driving amount of the actuator 110 based on the focus state of the lens section 10. The adjustment section 320 may adjust the driving amount of the actuator 110 so as to reduce the focus error detected by the focus detection section 310. Accordingly, the driving apparatus 100 according to the present embodiment can perform the autofocus function according to an image processing of high accuracy after performing the high-speed autofocus function using the infrared light and the like to achieve the focus adjustment at high speed and with high accuracy. Note that the storage section 152 may store the adjustment amount obtained by the adjustment section 320. Accordingly, if the control section 130 moves the lens section 10 next according to the control signal, the correction section 160 can further correct the position of the lens section 10 according to the adjustment amount stored by the storage section 152.

It has been described that the driving apparatus 100 according to the present embodiment described above takes, as the reference information, the magnetic field information output by the magnetic field detection section 120 according to the known magnetic field when the lens section 10 is positioned at the reference position. Note that when the driving apparatus 100 is in a state in which almost no influence of the disturbance magnetic field exists, even if the input magnetic field is not a known magnetic field, the driving apparatus 100 may also take the magnetic field information as the reference information.

That is, the driving apparatus 100 may take the magnetic field information output by the magnetic field detection section 120 as the reference information according to the magnetic field, that is input in the lens section 10 as a background noise and that is at a fixed intensity. In this case as well, as described above, the control section 130 may move the lens section 10 to the reference position and cause the storage section 152 to store, as the reference information, the magnetic field information output by the magnetic field detection section 120 in the state in which the lens section 10 is positioned at the reference position.

Also, the driving apparatus 100 may also receive the reference information from the outside. That is, the storage section 152 stores the reference information supplied from the outside. Accordingly, the driving apparatus 100 can correct the magnetic field information and/or the control signal by using the reference information obtained by another driving apparatus 100 and the like. In this case, the driving apparatus 100 may also further include an input section in which the reference information is input from the outside. Instead of this, the input section 170 may also respectively input the control signal and information to be the magnetic field information.

The driving apparatus 100 according to the present embodiment described above may be formed as a device in which at least parts are integrated. That is, the driving apparatus 100 may include a device in which the magnetic field detection section 120 and the control section 130 are integrally formed. The device may be formed into a chip as an integrated circuit. That is, the device may be formed as one chip driver IC of the actuator 110 incorporating the magnetic field detection section 120.

The example in which the driving apparatus 100 according to the present embodiment described above includes the magnetic field detection section 120 to detect the magnetic field generated by the magnetic field generation section 30 fixed to the lens section 10 has been described; however, the driving apparatus 100 is not limited to this. For example, the magnetic field detection section 120 may be provided in the lens section 10 and the magnetic field generation section 30 may also be provided separately and independently from the lens section 10. In this case, at least parts of the actuator 110 may be provided in the lens section 10. That is, even if a coil of the actuator 110 is fixed to the lens section 10 and the magnetic force is generated so as to attract or separate the magnetic field generation section 30, the actuator 110 can move the lens section 10.

Also, the example in which the magnetic field generation section 30 and the actuator 110 are provided separately and independently from each other has been described; however, they are not limited to this. For example, the magnetic field detection section 120 may detect the magnetic field generated by the actuator 110, and in this case, the magnetic field generation section 30 is included in the actuator 110.

Note that if the magnetic field generation section 30 is included in the actuator 110, the actuator 110 may cause the magnetic force to be generated so as to attract or separate the lens holder 22 and the like, and in this case, it is desirable that the magnetic field detection section 120 is fixed to the lens section 10. Also, if the actuator 110 including the magnetic field generation section 30 is fixed to the lens section 10, the actuator 110 may cause the magnetic force to be generated so as to attract or separate metals and the like which are provided separately and independently from the lens section 10.

In the present embodiment described above, the example of the driving apparatus 100 that moves the lens section 10 has been described; however, the driving apparatus 100 is not limited to the present example. The driving apparatus 100 may also move an imaging device, an image sensor section or the like which detects an image obtained by collecting lights by the lens 20. That is, the actuator 110 may move the image sensor section, and the magnetic field detection section 120 may detect the magnetic field of the magnetic field generation section 30 fixed to the image sensor section. In this way, the actuator 110 may change a relative position between the lens section 10 and the imaging device that detects the image obtained by collecting the lights by the lens 20. Also, the magnetic field detection section 120 may detect the magnetic field information corresponding to the relative position between the lens section 10 and the imaging device.

In the present embodiment described above, the driving apparatus 100 that moves the lens section 10 has been described. Note that the driving apparatus 100 may also be a part of a lens unit. That is, the lens unit includes the lens section 10 and the driving apparatus 100. Also, the lens unit may also be combined with the signal supply section 200 to configure a lens system. In the present embodiment described above, the example in which the disturbance magnetic field information is evaluated by the actual measurement has been described; however, if the variation of the information is not large, a fixed value given in advance, an observed value observed in advance, a value including partial arithmetic operations or the like may also be used. Also, the storage section 152 may be nonvolatile or may be volatile.

Also, in the present embodiment, the autofocus operation has been described as an example; however, it goes without saying that an actuator used in a configuration capable of detecting the magnetic field can perform similar operations such as the camera shake correction, an iris control and a zoom control. Also, the configuration capable of detecting the magnetic field may also be a hall element, or may also be a magneto resistive element (MR) being another magnetic sensor, a giant magneto resistive element (GMR), a tunnel magneto resistive effect element (TMR), and a magnet impedance element (MI element). Also, for example, the configuration may also be a configuration in which a sensor and LSI are integrated with each other such as the driver IC incorporating the hall element. Also, in the present implementation example, the example in which the magnetic field generation section 30 is fixed to the lens section 10 has been described; however, it is not limited to this. For example, the configuration may also be a configuration in which the magnetic field detection section 120 is fixed to the lens section 10 and the magnetic field generation section 30 is fixed to a certain position separate from that of the lens section 10.

In the present embodiment described above, the example in which the driving apparatus 100 includes the device in which at least parts are integrated has been described. In addition to this, the driving apparatus 100 may also include a device in which the position information of the lens section 10 and the reference information are input and which outputs the corrected driving amount obtained by correcting the driving amount of the actuator 110. That is, the device is a device in which the correction section 160 and the control section 130 are integrated. For such a device, details are described by using FIG. 9.

Figure 9:
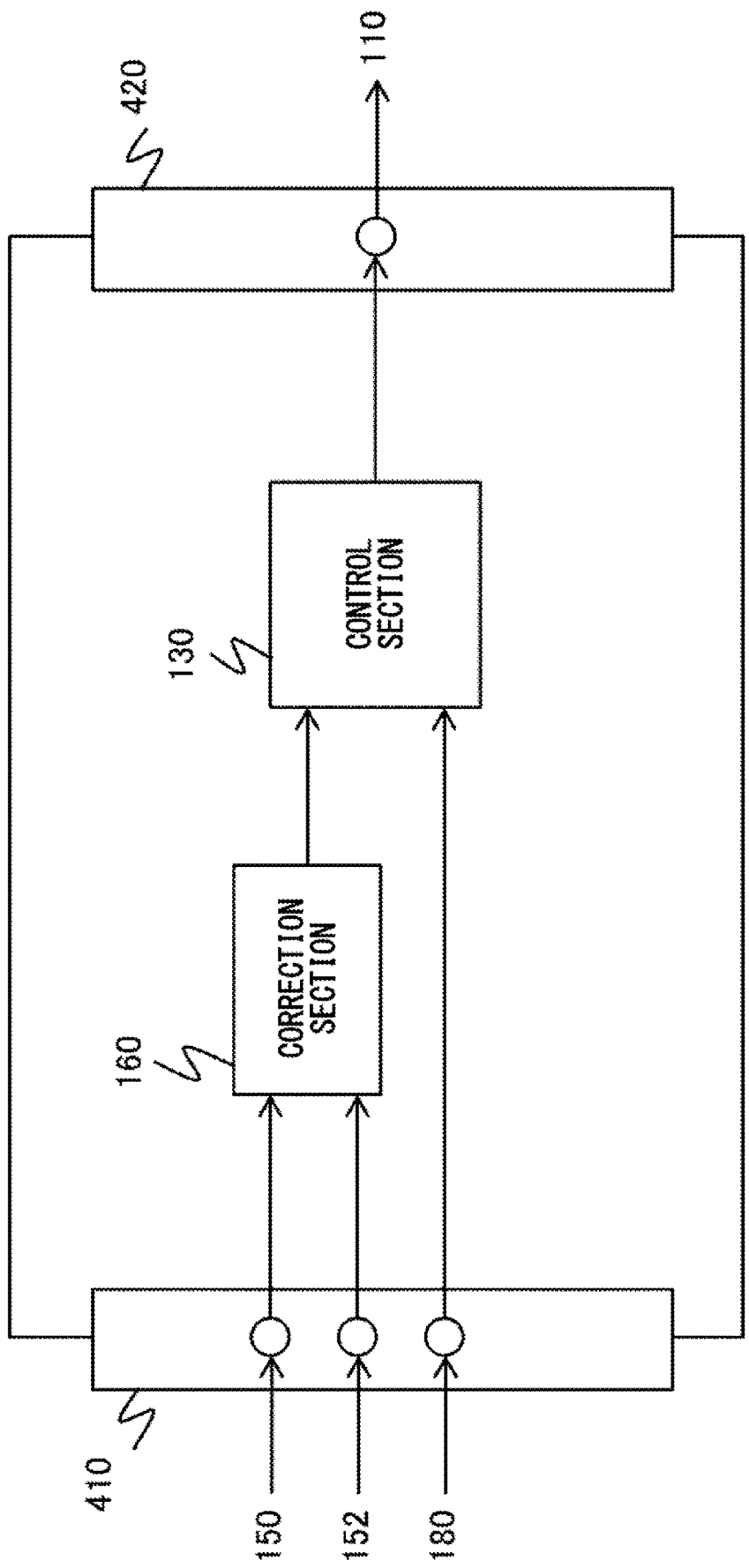
FIG. 9 shows a configuration example of a device 400 in which parts of the driving apparatus 100 according to the present embodiment are integrated.

FIG. 9 shows a configuration example of a device 400 in which parts of the driving apparatus 100 according to the present embodiment are integrated. The device 400 includes a control section 130, a correction section 160, an input section 410, and an output section 420.

The input section 410 inputs the position information of the lens section 10 and the reference information that is based on the output of the magnetic field detection section 120 when the lens section 10 is positioned at the reference position. Also, the input section 410 may input the driving amount of the actuator 110. For example, the input section 410 is connected to an AD conversion section 150 and inputs, as the position information, the magnetic field information corresponding to the position of the lens section 10 from the AD conversion section 150. Also, the input section 410 may be connected to the storage section 152 to input the reference information stored in the storage section 152. Instead of this, the input section 410 may further include a storage section 152 that stores the reference information. Also, the input section 410 may be connected to the reception section 180 and input, as the driving amount of the actuator 110, the control signal received from the reception section 180.

As previously described, the correction section 160 calculates the correction value for the position information of the lens section 10 based on the reference information. For example, the correction section 160 calculates the correction value to correct the driving amount of the actuator 110 based on the reference information, and outputs the correction value to the control section 130. Also, the correction section 160 may also correct the position information of the lens section 10 based on the reference information, and output the corrected position information to the control section 130 as the correction value.

As previously described, the control section 130 controls the driving amount of the actuator 110 based on the driving amount of the actuator 110 received from the input section 410 and the correction value received from the correction section 160. For example, the control section 130 calculates the corrected driving amount obtained by correcting the driving amount of the actuator based on the driving amount of the actuator 110 and the correction value.

Then, the output section 420 outputs the corrected driving amount corrected by the control section 130. The output section 420 may be connected to the actuator 110 and supply the corrected driving amount to the actuator 110. As described above, the device 400 can output, to the actuator 110, the corrected driving amount obtained by correcting the driving amount of the actuator based on the position information of the lens section 10 and the reference information. Such a device 400 can correspond to various actuators 110.

Figure 10:
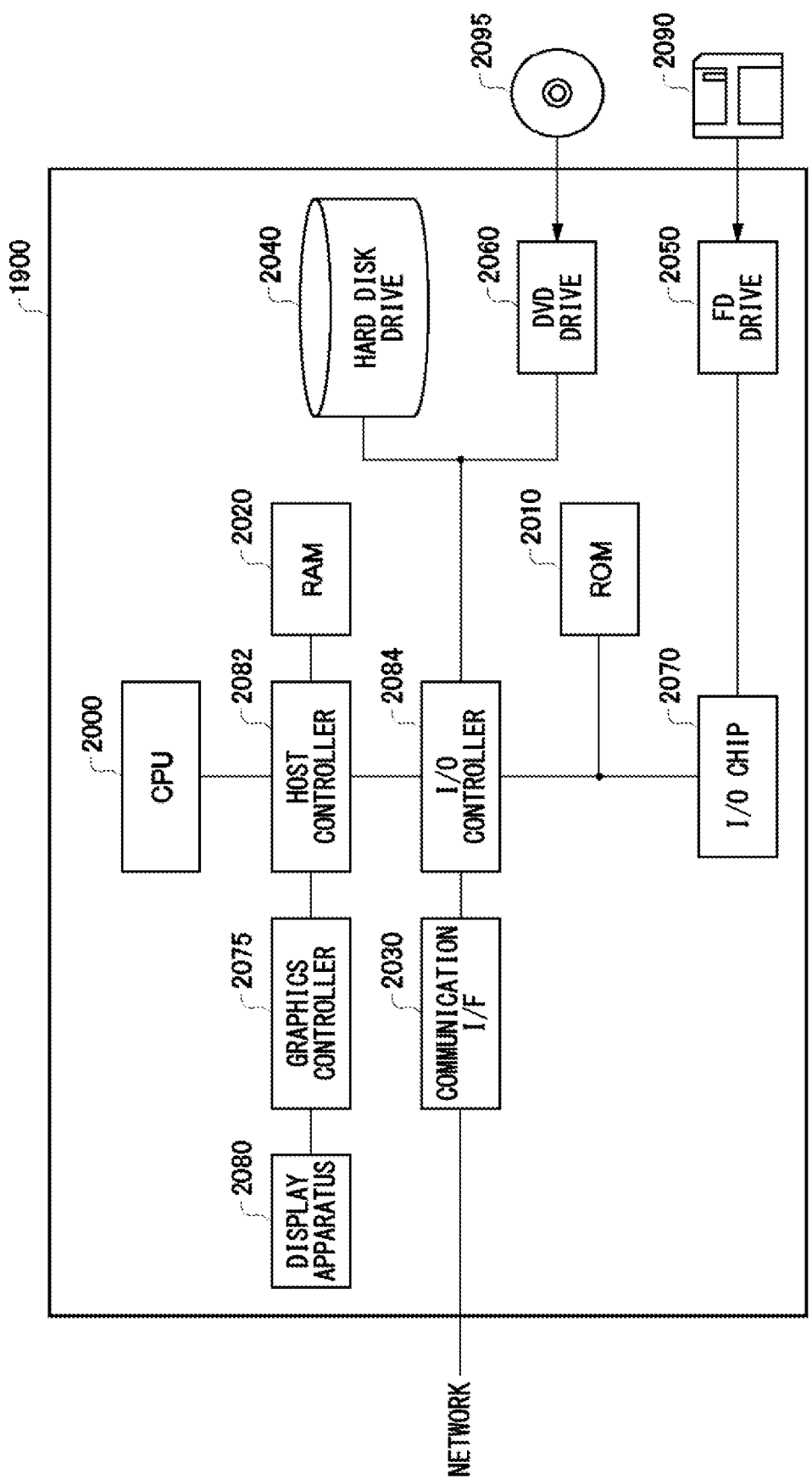
FIG. 10 shows one example of a hardware configuration of a computer 1900 that functions as the driving apparatus 100 according to the present embodiment.

FIG. 10 shows one example of a hardware configuration of a computer 1900 that functions as the driving apparatus 100 according to the present embodiment. The computer 1900 according to the present embodiment includes a CPU peripheral section that includes a CPU 2000, a RAM 2020, a graphics controller 2075, and a display apparatus 2080 which are connected mutually by a host controller 2082; an input/output section that includes a communication interface 2030, a hard disk drive 2040, and a DVD drive 2060 which are connected to the host controller 2082 by an input/output controller 2084; and a legacy input/output section that includes a ROM 2010, a flexible disk drive 2050, and an input/output chip 2070 which are connected to the input/output controller 2084.

The host controller 2082 connects the RAM 2020 to the CPU 2000, which accesses the RAM 2020 at a high transfer rate, and the graphics controller 2075. The CPU 2000 operates based on a program stored in the ROM 2010 and the RAM 2020 to perform controlling on each section. The graphics controller 2075 obtains image data that is generated, by the CPU 2000 and the like, on a frame buffer provided within the RAM 2020, and displays the image data on the display apparatus 2080. Instead of this, the graphics controller 2075 may also include the frame buffer that stores the image data generated by the CPU 2000 and the like therein.

The input/output controller 2084 connects the host controller 2082 to the communication interface 2030 being a relatively high-speed input/output apparatus, the hard disk drive 2040, and the DVD drive 2060. The communication interface 2030 communicates with other apparatuses via a network. The hard disk drive 2040 stores a program and data used by the CPU 2000 within the computer 1900. The DVD drive 2060 reads the program or data from the DVD-ROM 2095, and provides the read program or data to the hard disk drive 2040 via the RAM 2020.

Also, the input/output controller 2084 is connected to the ROM 2010, the flexible disk drive 2050, and a relatively low-speed input/output apparatus of the input/output chip 2070. The ROM 2010 stores a boot program that is executed by the computer 1900 during start-up and/or a program that depends on hardware of the computer 1900, and the like. The flexible disk drive 2050 reads the program or data from the flexible disk 2090 and provides the read program or data to the hard disk drive 2040 via the RAM 2020. The input/output chip 2070 connects the flexible disk drive 2050 to the input/output controller 2084, and connects various input/output apparatuses to the input/output controller 2084 at the same time via a parallel port, a serial port, a keyboard port, a mouse port and the like, for example.

The program provided to the hard disk drive 2040 via the RAM 2020 is stored in a recording medium such as the flexible disk 2090, the DVD-ROM 2095, or an IC card, and is provided by a user. The program is read from the recording medium, is installed in the hard disk drive 2040 within the computer 1900 via the RAM 2020, and is executed in the CPU 2000.

The program is installed in the computer 1900, and causes the computer 1900 to function as the control section 130, the correction section 160, the focus detection section 310, and the adjustment section 320.

Information processing described in the program functions, by being read in the computer 1900, as the control section 130, the correction section 160, the focus detection section 310, and the adjustment section 320 which are the specific means of cooperation of software and the above-described various hardware resources. Also, according to these specific means, the specific driving apparatus 100 corresponding to a usage purpose is configured by achieving the arithmetic operation or the information processing corresponding to the usage purpose of the computer 1900 in the present embodiment.

As one example, if a communication between the computer 1900 and the apparatus or the like on the outside is to be performed, the CPU 2000 executes the communication program loaded on the RAM 2020 and instructs the communication interface 2030 to perform a communication processing based on the processing contents described in the communication program. The communication interface 2030 receives a control of the CPU 2000, reads transmission data that is stored in a transmission buffer area and the like provided on a storage device such as the RAM 2020, the hard disk drive 2040, the flexible disk 2090 or the DVD-ROM 2095, and sends the transmission data to the network, or writes reception data received from the network in a reception buffer area and the like provided on the storage device. In this way, the communication interface 2030 may also transfer the transmission/reception data to/from the storage device by a DMA (Direct Memory Access) scheme. Instead of this, the communication interface 2030 may also transfer the transmission/reception data by reading, by the CPU 2000, the data from the storage device or the communication interface 2030 being the transfer source and writing the data to the communication interface 2030 or the storage device being the transfer destination.

Also, the CPU 2000 reads, to the RAM 2020 by the DMA transfer and the like, all or required parts of files, database or the like stored in an external storage device such as the hard disk drive 2040, the DVD drive 2060 (the DVD-ROM 2095) and the flexible disk drive 2050 (the flexible disk 2090) to perform various processes on the data on the RAM 2020. Then, the CPU 2000 writes back the data after the processing is completed to the external storage device by the DMA transfer and the like. As it is considered that in such a processing, the RAM 2020 temporarily holds the contents of the external storage device, in the present embodiment, the RAM 2020, the external storage device and the like are collectively referred to as a memory, a storage section, a storage device or the like. Various programs and various information, such as the data, tables, database and the like, in the present embodiment are stored on such a storage device and are objects of the information processing. Note that the CPU 2000 can also hold parts of the RAM 2020 in a cache memory to perform reading and writing on the cache memory. In such a configuration as well, because the cache memory serves as a part of the functions of the RAM 2020, in the present embodiment, the cache memory is also included in the RAM 2020, the memory, and/or the storage device, unless it is shown discriminately.

Also, the CPU 2000 performs, on the data read from the RAM 2020, various processes including various arithmetic operations, information processes, condition determination, information searches and/or replacements and the like, which are specified by an instruction sequence of the program and which are described in the present embodiment, and writes back the data to the RAM 2020. For example, if the condition determination is to be performed, the CPU 2000 determines whether various variables shown in the present embodiment satisfy conditions such as larger, smaller, equal to or larger than, equal to or smaller than, or equal to other variables or constants, and if the condition is satisfied (or if the condition is not satisfied), the CPU 2000 branches to a different instruction sequence or calls a subroutine.

Also, the CPU 2000 can search the information stored in the files, database or the like within the storage device. For example, if a plurality of entries each having an attribute value of a second attribute associated with an attribute value of a first attribute are stored in the storage device, the CPU 2000 can obtain, by searching, from the plurality of entries stored in the storage device, an entry in which the attribute value of the first attribute matches a specified condition and reading the attribute value of the second attribute stored in the entry, the attribute value of the second attribute associated with the first attribute that satisfies the predetermined condition.

The program or module shown above may also be stored in an external recording medium. As the recording medium, other than the flexible disk 2090 and the DVD-ROM 2095, an optical recording medium such as DVD, Blu-ray (registered trademark) or CD, a magneto-optical recording medium such as MO, a tape medium, a semiconductor memory such as an IC card, and the like can be used. Also, a hard disk or a storage device, such as a RAM, provided in a server system connected to a dedicated communication network or Internet may also be used as the recording medium and provide the program to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A driving apparatus, comprising:
    an actuator to change a relative position between a lens section and an imaging device;
    a magnetic field detection section to detect magnetic field information corresponding to the relative position between the lens section and the imaging device;
    a storage section to store reference information that is based on a difference between a first magnetic field value corresponding to the lens section or the imaging device at a reference position when the lens section and the imaging device are in an initial non-operational state of the driving apparatus in a known magnetic field in which a disturbance magnetic field is not input, and a second magnetic field value corresponding to the lens section or the imaging device at the reference position when the lens section and the imaging device are in an actual operation state of the driving apparatus subject to an external disturbance magnetic field; and
    a control section to control a driving amount of the actuator during actual operation of the driving apparatus based on an output of the magnetic field detection section and the reference information.

2. The driving apparatus according to claim 1, wherein the storage section further stores reference information supplied from outside.

3. The driving apparatus according to claim 1, further comprising:
    a focus detection section to detect a focus state of the lens section; and
    an adjustment section to adjust the driving amount of the actuator based on the focus state of the lens section.

4. The driving apparatus according to claim 1, wherein:
    the magnetic field detection section and the control section are integrally formed.

5. A lens unit, comprising:
    the lens section; and
    the driving apparatus according to claim 1.

6. The driving apparatus according to claim 1, wherein the reference information is measured in the environment further comprising:
    the actuator not being driven.

7. A driving apparatus, comprising:
    an actuator to move a lens section that is movable in at least one direction of an optical axis direction and a direction different from the optical axis direction;
    a magnetic field detection section to detect magnetic field information corresponding to a position of the lens section;
    a storage section to store reference information that is based on a difference between a first magnetic field value corresponding to the lens section at a reference position when the lens section is in an initial non-operational state of the driving apparatus in a known magnetic field in which a disturbance magnetic field is not input, and a second magnetic field value corresponding to the lens section at the reference position when the lens section is in an actual operation state of the driving apparatus subject to an external disturbance magnetic field; and
    a control section to control a driving amount of the actuator during actual operation of the driving apparatus based on an output of the magnetic field detection section and the reference information.

8. The driving apparatus according to claim 7, wherein the control section causes the storage section to store, as the reference information, magnetic field information output by the magnetic field detection section in a state in which the lens section is positioned at the reference position.

9. The driving apparatus according to claim 7, comprising:
    a correction section to correct a driving amount of the actuator after the storage section stores reference information, wherein correcting the driving amount of the actuator is based on magnetic field information detected by the magnetic field detection section in a state in which the lens section is positioned at the reference position.

10. The driving apparatus according to claim 9, wherein the correction section corrects the magnetic field information and outputs the corrected magnetic field information, and
    the control section controls the driving amount of the actuator based on the corrected magnetic field information.

11. The driving apparatus according to claim 9, comprising: an input section to input a control signal that specifies a target position of the lens section, wherein
    the correction section corrects the control signal input from the input section.

12. The driving apparatus according to claim 7, wherein
    the lens section includes a magnetic field generation section to generate a magnetic field, wherein
    the magnetic field detection section detects a magnetic field generated by the magnetic field generation section and outputs the magnetic field information.

13. The driving apparatus according to claim 7, wherein the magnetic field detection section outputs magnetic field information of a magnitude corresponding to a position of the lens section in one direction.

14. The driving apparatus according to claim 7, wherein the lens section is movable in at least one direction of the optical axis direction and a direction perpendicular to the optical axis direction.

15. The driving apparatus according to claim 7, wherein the reference information is measured in the environment further comprising:
    the actuator not being driven.

16. A correction method of a driving apparatus that moves a position of a lens section, the correction method comprising:
    storing reference information that is based on a difference between a first magnetic field value when the lens section is positioned at a reference position when the lens section is in an environment in an initial state in a known magnetic field in which a disturbance magnetic field is not input in the apparatus, and a second magnetic field value corresponding to the lens section at the reference position when the lens section is in an environment in an actual operation state of the driving apparatus subject to an external disturbance magnetic field; and controlling the driving apparatus during actual operation of the driving apparatus based on a detected magnetic field information and the reference information.

17. The correction method according to claim 16, wherein the storing the reference information includes storing the reference information input from the outside.

18. The correction method according to claim 16, further comprising:

correcting the magnetic field information corresponding to a position of the lens section; and inputting a control signal that specifies a target position of the lens section, wherein the controlling the driving apparatus includes controlling the driving apparatus based on the corrected magnetic field information and the control signal.

19. The correction method according to claim 18, wherein the controlling the driving apparatus includes:

moving the lens section to a specified position by using the driving apparatus after the correction;

detecting a focus state of the lens section; and further correcting the driving apparatus based on the focus state of the lens section.

20. The correction method according to claim 16, further comprising:

inputting a control signal that specifies a target position of the lens section; and correcting the input control signal, wherein the controlling the driving apparatus includes controlling the driving apparatus based on the corrected control signal and the magnetic field information.

21. The correction method of a driving apparatus according to claim 16, wherein the reference information is measured in the environment further comprising:

the driving apparatus not moving the lens section.

22. A device, comprising:

an input section to input position information of a lens section and reference information that is based on the lens section positioned at a reference position, the reference information being based on a difference between a first magnetic field value corresponding to the lens section at the reference position when the lens section is in an initial non-operational state of the device in a know magnetic field in which a disturbance magnetic field is not input, and a second magnetic field value corresponding to the lens section at the reference position when the lens section is in an actual operation state of the device subject to an external disturbance magnetic field;

a correction section to calculate a correction value for position information of the lens section based on the reference information; and an output section to output a corrected driving amount obtained by correcting a driving amount of an actuator based on the correction value, the corrected driving amount being output during actual operation of the actuator based on the input position information and the correction value.

23. The device according to claim 22, wherein the reference information is measured in the environment when the lens section is not being driven.

* * * * *